United States Patent
Freire et al.

(10) Patent No.: US 11,240,266 B1
(45) Date of Patent: Feb. 1, 2022

(54) SYSTEM, DEVICE AND METHOD FOR DETECTING SOCIAL ENGINEERING ATTACKS IN DIGITAL COMMUNICATIONS

(71) Applicant: Social Safeguard, Inc., Charlottesville, VA (US)

(72) Inventors: Otavio R. Freire, Charlottesville, VA (US); Ruben Jimenez, Flushing, NY (US)

(73) Assignee: Social Safeguard, Inc., Charlottesville, VA (US)

( * ) Notice: Subject to any disclaimer, the term of this patent is extended or adjusted under 35 U.S.C. 154(b) by 0 days.

(21) Appl. No.: 17/377,919

(22) Filed: Jul. 16, 2021

(51) Int. Cl.
  *H04L 29/06* (2006.01)
  *H04L 29/12* (2006.01)
  *H04L 12/24* (2006.01)

(52) U.S. Cl.
  CPC .......... *H04L 63/1466* (2013.01); *H04L 41/16* (2013.01); *H04L 61/2503* (2013.01); *H04L 63/0807* (2013.01)

(58) Field of Classification Search
  CPC ............. H04L 63/1466; H04L 63/1425; G06F 16/3338; G06F 40/58; G06K 9/6256
  USPC ........................................................ 726/23
  See application file for complete search history.

(56) References Cited

U.S. PATENT DOCUMENTS

| | | | | |
|---|---|---|---|---|
| 8,332,206 B1* | 12/2012 | Sadovsky | ............. | G06F 40/242 704/5 |
| 9,027,134 B2* | 5/2015 | Foster | ................. | H04L 63/1441 726/22 |
| 9,332,025 B1* | 5/2016 | Watson | ............... | H04L 63/1408 |
| 9,912,681 B1* | 3/2018 | Ismael | .................... | G06F 21/55 |
| 10,104,113 B1* | 10/2018 | Stein | .................... | H04L 63/1433 |
| 2003/0125927 A1* | 7/2003 | Seme | ...................... | G06F 40/58 704/3 |
| 2003/0145285 A1* | 7/2003 | Miyahira | .............. | G06F 40/232 715/257 |
| 2010/0235313 A1* | 9/2010 | Rea | ........................ | G06F 16/335 706/52 |
| 2011/0138471 A1* | 6/2011 | Van De Weyer | ..... | G06F 21/554 726/25 |
| 2014/0104175 A1* | 4/2014 | Ouyang | ................ | G06F 3/0237 345/168 |

(Continued)

FOREIGN PATENT DOCUMENTS

| | | | | | |
|---|---|---|---|---|---|
| CN | 104679642 A | * | 6/2015 | ............. | G06F 40/58 |
| CN | 104780038 A | * | 7/2015 | | |

(Continued)

OTHER PUBLICATIONS

Aboluwann et al., "Optimizing Short Message Text Sentiment Analysis for Mobile Device Forensics", 2016 (Year: 2016).*

(Continued)

*Primary Examiner* — Ondrej C Vostal
(74) *Attorney, Agent, or Firm* — Williams Mullen; Thomas F. Bergert (57) ABSTRACT

Embodiments of the present disclosure use natural language processing, machine learning and relevant corpora to detect social engineering attacks with a high degree of accuracy. In various embodiments, lexical features, spelling features and topical features are automatically analyzed from a source text and a model is employed to assess the likelihood that the source message is a social engineering attack.

21 Claims, 2 Drawing Sheets

(56) References Cited

U.S. PATENT DOCUMENTS

| | | | |
|---|---|---|---|
| 2015/0254566 A1* | 9/2015 | Chandramouli | G06F 40/10 |
| | | | 706/11 |
| 2015/0262238 A1* | 9/2015 | Aitchison | G06F 40/30 |
| | | | 705/14.6 |
| 2015/0334458 A1* | 11/2015 | Srinivasan | H04N 21/4667 |
| | | | 725/14 |
| 2016/0063122 A1* | 3/2016 | Asur | G06F 16/2477 |
| | | | 707/725 |
| 2016/0357964 A1* | 12/2016 | Mulchandani | G06F 21/566 |
| 2018/0033089 A1* | 2/2018 | Goldman | G06Q 40/10 |
| 2018/0097827 A1* | 4/2018 | Stolarz | H04L 51/12 |
| 2018/0218157 A1* | 8/2018 | Price | H04L 63/1433 |
| 2019/0058721 A1* | 2/2019 | Cullison | H04L 63/1425 |
| 2019/0065748 A1* | 2/2019 | Foster | G06F 21/57 |
| 2019/0108222 A1* | 4/2019 | Anglin | G06N 7/00 |
| 2019/0205396 A1* | 7/2019 | Gubanov | G06F 40/51 |
| 2020/0042316 A1* | 2/2020 | Roy | G06F 16/93 |
| 2020/0067861 A1* | 2/2020 | Leddy | H04L 51/12 |
| 2020/0104635 A1* | 4/2020 | Xu | G06K 9/6248 |
| 2020/0226214 A1* | 7/2020 | Reddekopp | G06N 20/00 |
| 2020/0234109 A1* | 7/2020 | Lee | G06Q 10/107 |
| 2021/0157858 A1* | 5/2021 | Stevens | G06F 16/24568 |
| 2021/0211472 A1* | 7/2021 | Murray | H04L 63/20 |

FOREIGN PATENT DOCUMENTS

| | | | |
|---|---|---|---|
| CN | 112507065 A | * 3/2021 | |
| CN | 112840336 A | * 5/2021 | G06F 40/30 |
| WO | WO-2019199719 A1 | * 10/2019 | G06Q 30/0202 |

OTHER PUBLICATIONS

Almeida et al., "Text normalization and semantic indexing to enhance Instant Messaging and SMS spam filtering", 2016 (Year: 2016).*

Bardon et al., "Authorship verification verification applied to detection of compromised accounts on online social networks", 2017 (Year: 2017).*

Beheshti et al., "Data Curation APIs", 2016 (Year: 2016).*

Chee, "Visualizing Topics and Social Networks within a Health Newsgroup", 2007 (Year: 2007).*

Dhanasekaran et al., "Nature-inspired Classification for Mining Social Space Information: National Security Intelligence and Big Data Perspective", 2016 (Year: 2016).*

Doshi et al., "Steganography and Its Application in Security", 2012 (Year: 2012).*

Gupta et al., "PROFORMA: Proactive Forensics with Message Analytics", 2017 (Year: 2017).*

Hadjidj et al., "Towards an integrated e-mail forensic analysis framework", 2009 (Year: 2009).*

Iqbal, "Messaging Forensic Framework for Cybercrime Investigation", 2011 (Year: 2011).*

Keretna et al., "Recognising User Identity in Twitter Social Networks via Text Mining", 2013 (Year: 2013).*

Kolajo et al., "A Framework for Pre-processing of Social Media Feeds based on Integrated Local Knowledge Base", 2006 (Year: 2006).*

Kucukyilmaz et al., "Chat mining: Predicting userand message attributes in computer-mediated communication", 2017 (Year: 2017).*

Lan, "Chat-Oriented Social Engineering Attack Detection Using Attention-based Bi-LSTM and CNN", 2021 (Year: 2021).*

Mandala et al., "Social media sentiments calculus: profile based mapping social media sentiments calculus using cloud computing, deep learning programming", IN 202011031626 A, 2020 (Year: 2020).*

Modupe et al., "Semi-Supervised Probabilistics Approach for Normalising Informal Short Text Messages", 2017 (Year: 2017).*

Naseem et al., "A Comprehensive Survey on Word Representation Models: From Classical to State-Of-The-Art Word Representation Language Models", 2018 (Year: 2018).*

Sahoo et al., "Malicious URL Detection using Machine Learning: A Survey", 2019 (Year: 2019).*

Salawu et al., "Approaches to Automated Detection of Cyberbullying: A Survey", 2020 (Year: 2020).*

Schiller et al., "Methods, apparatus and software for analyzing the content of micro-blog messages", TW 201118589 A, 2011 (Year: 2011).*

Tran et al., "Towards a Feature Rich Model for Predicting Spam Emails containing Malicious Attachments and URLs", 2014 (Year: 2014).*

Vilares et al., "On the Usefulness of Lexical and Syntactic Processing in Polarity Classification of Twitter Messages", 2015 (Year: 2015).*

Vrochidis et al., "A Multimodel Analytics Platform for Journalists Analyzing Large-Scale, Heterogeneous Multilingual, and Multimedia Content", 2018 (Year: 2018).*

Xue et al., "Machine Learning-Based Analysis of Program Binaries: A Comprehensive Study", 2019 (Year: 2019).*

Almomani et al., "A Survey of Phishing Email Filtering Techniques", 2013 (Year: 2013).*

* cited by examiner

SYSTEM, DEVICE AND METHOD FOR DETECTING SOCIAL ENGINEERING ATTACKS IN DIGITAL COMMUNICATIONS

TECHNICAL FIELD

The present disclosure relates to cybersecurity and, more specifically, to a system, device and method for detecting social engineering attacks.

BACKGROUND

Cybersecurity attacks using digital communications are rampant. No matter how many layers of security solutions are implemented, organizations and their networks are still vulnerable. A targeted attack can breach purportedly secure networks, steal the data contained therein or otherwise cause great harm.

Security attacks across third party digital channels, including social media and mobile chat applications such as WhatsApp™ and Telegram™ are growing more targeted and becoming more social engineering focused. Social engineering attacks that occur within these channels evade traditional cybersecurity detection since they are based on human communications and there is an absence of links or files to investigate. Unscrupulous actors often bait their targets through perceived digital human connections and focus on communications as the primary lure for action that creates cyber-fraud. Such unscrupulous attackers are moving beyond mass-phishing and malicious payload blasts, and instead are researching their targets in social channels, like LinkedIn™, before sending socially engineered messages to their victims. The consequences that victims who fall prey to social engineering attacks suffer include data loss, account takeover, credential phishing, blackmail, payroll fraud, and vendor invoice fraud.

Many organizations lack visibility into threats on third-party communications channels. Messages appearing in an e-mail, SMS message or other communication can appear as an authoritative action request, a call to action request, a credentials information or update request, a payment or invoice related message, a personal information request, a secrecy request, an urgent action request, an unexpected prize or award offer, a report of suspicious activity or other seemingly innocent form. Such messages may also include a malicious payload, such as files, links, etc. Regardless, such messages often succeed in prompting a recipient to click a link, input sensitive information or credentials and take other action that can lead to harm.

SUMMARY

To help address these problems, various embodiments of the present disclosure provide a system, device and method that detect social engineering attacks across digital communications channels and can protect digital accounts from business communication compromise (BCC). Embodiments of the present disclosure use natural language processing, machine learning and relevant corpora to detect social engineering attacks with a high degree of accuracy. In various embodiments, lexical features, spelling features and topical features are automatically analyzed from a source text and a model is employed to assess the likelihood that the source message is a social engineering attack.

DESCRIPTION OF EXEMPLARY EMBODIMENTS

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

It will be appreciated that reference to "a", "an" or other indefinite article in the present disclosure encompasses one or a plurality of the described element. Thus, for example, reference to a processor may encompass one or more processors, a message may encompass one or more messages, a topic may encompass one or more topics and so forth.

Figure 1:
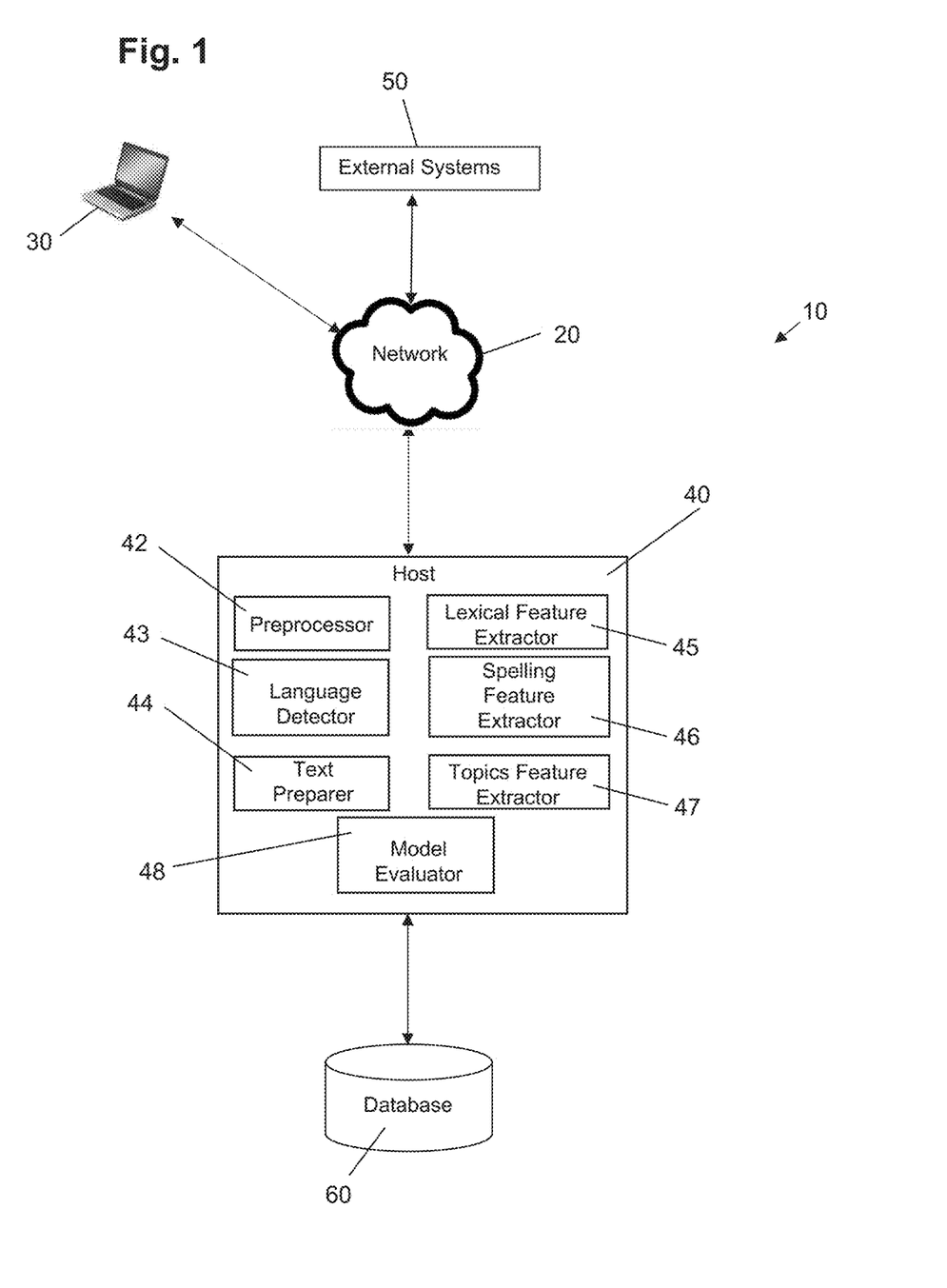
FIG. 1 shows a schematic diagram of a system according to embodiments of the present disclosure.

FIG. 1 is a schematic diagram of a system 10 for detecting social engineering attacks in accordance with various embodiments as described herein. As shown therein, system 10 includes a host 40 which can receive messages in many forms from a computing device 30 over a network 20. The computing device 30 need not be considered part of the system 10 and/or may be an e-mail server or the like that may process incoming messages through the host 40 prior to dissemination to intended recipients. The host 40 and its various components can incorporate necessary processing power and memory for storing data and programming that can be employed by the processor(s) to carry out the functions and communications necessary to facilitate the processes and functionalities described herein.

In various embodiments, system processing is separated into three phases of evaluation. The first phase is pre-processing and text preparation. In this phase, the input message goes through initial attributes extraction and token extraction. In the second phase, features are extracted from the original message or the message tokens to be passed to a trained machine model. In the third phase, all features are extracted from the message and scored using the model. The output of the model is a final risk assessment indicating if the analyzed message is potentially a social engineering attack, and such risk assessment can be followed by appropriate remedial action.

Figure 2:
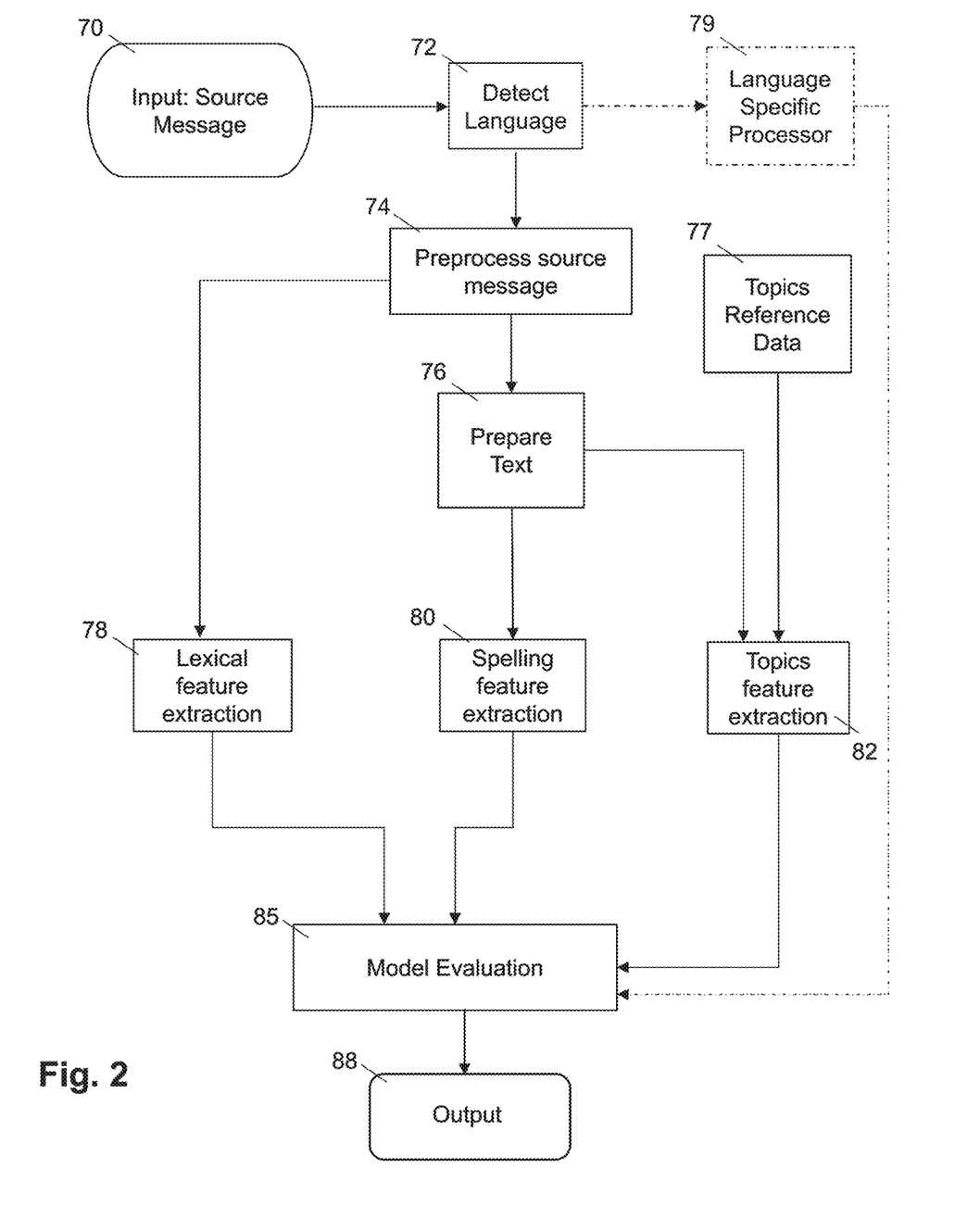
FIG. 2 shows an exemplary workflow diagram for embodiments of a social engineering attack evaluation in accordance with the present disclosure.

As shown in FIGS. 1 and 2, the host 40 can include components that automate and/or assist with the above-described phases of detection of social engineering threats and attacks. For example, the host 40 includes a preprocessor component 42, which can receive the original text message being analyzed and can preprocess the message such as by extracting one or more key attributes before future actions modify the text for further analysis. This processing leverages custom expressions that are used to identify and remove attributes from the text, such as uniform resource locators (URLs), e-mail addresses and Internet protocol (IP) addresses, for example. Such removed attributes can be assembled in an attributes list. Once the original message is preprocessed, the source message is passed on to the language detector 43 and the text preparer 44, whereas the attributes list is passed on to the lexical feature extractor 45.

The text preparation portion of the first phase of processing begins by detecting what language the source message is in through language detector 43. This is important to ensure that text tokenization is done in the appropriate manner. For example, languages like Japanese do not use spacing the way western languages do and must be processed appropriately. This is a requirement for all advanced natural language processing (NLP) processing steps.

Once the language has been detected, the text tokenization can begin via the text preparer 44. The text preparer 44 receives the input text and breaks it up into logical tokens that are to be evaluated in the feature extraction phase. The text preparer 44 can include programming for updating the text message to include Part of Speech (POS) tags for each word in the text. This includes labels like noun, proper noun, verb, adverb, etc. Further, the text preparer 44 can remove stop words from the text. These are words like "is", "the", "a" and others that are not needed for future action. In various embodiments, the text preparer 44 also lemmatizes the tokenized words so as to group similar words with different inflections into a single term for further processing and analysis. For example, a tokenized word "has" may have a lemma of "have" or a tokenized word "required" may have a lemma of "require". The text preparer 44 can send the prepared text to the spelling feature extractor 46 and topics feature extractor 47.

The lexical feature extractor 45 can receive the attributes list generated in the pre-processing phase and evaluate whether any elements within these attributes may be a sign of attack. For example, the inclusion of a URL that has an IP address instead of a domain name is not normal in business communications. The use of an unusually long URL in the message is a strategy to mask a suspicious domain or subdomain of the URL. A domain name in a URL or e-mail address that has more than three dots is uncommon and a sign of a potential risk. Further, the Levenshtein distance between domains found in text and popular domains can be calculated by the lexical feature extractor 45 to determine if possible fake domains are in use. For instance, "facebok.com" or "amazn.com" may be employed in an attack. In these cases, the domain in use is extremely close to facebook.com and amazon.com. Most users will not notice the difference and consider them safe. The results of these components can be combined into a vector that will be combined with other text features and passed to the model evaluator 48 for analysis.

The spelling feature extractor 46 can receive the list of cleaned tokens and analyze them for spelling errors. For example, the spelling feature extractor 46 can count the number of misspelled words in a message or document and then generate a normalized metric for this count based on the length of the message. This normalized misspelled word count can be used in conjunction with other extracted features by the model. In various embodiments, the spelling feature extractor 46 outputs a ratio of spelling mistakes for further processing.

The topics feature extractor 47 can analyze the cleaned tokens list and evaluate the list for common topics included in social engineering attack messages. These topics can be processed using a combination of NLP techniques as described herein to detect meaning such as (i) urgency, where the message recipient is being pressured to do something; (ii) surprise/award, where there is some sort of gift or unexpected award detailed in the message; (iii) privacy/secrecy, where there is pressure to keep the communication private; (iv) credentials, where the message recipient is being asked to verify or change their password or credentials; (v) suspicious activity, where an attacker is trying to get the recipient to believe that there is something wrong with their account or that they have been attacked; (vi) payment/invoice, where the intent is to get the message recipient to make a payment on a fake invoice; (vii) authority/boss, where the sender attempts to impersonate an individual with authority; and/or (viii) call to action, where the message asks the recipient to do something.

In order to determine if a topic is present in the source message, the following approach can be used by the topics feature extractor 47. First, each token created by the text preparer can be transformed into an embeddings representation using state of the art NLP techniques based on bidirectional transformers that are trained on unannotated text from the web. Second, correlations (cosine similarity) are calculated between the token embedding and topic embeddings that can be generated from a lexicon for each topic. It will be appreciated that the embeddings can be generated for token lemmas and token parts of speech (POS) tags according to different embodiments of the present disclosure. In various embodiments, topic reference data is employed and the topic reference data can be stored in a database 60 accessible by the host 40 and/or provided through an external system 50 accessible by the host 40 over network 20. For each token, a maximum correlation score of all topics is generated, and the correlation score is compared to a minimum threshold. If the correlation score is below a threshold, the topic score can be set to 0. A sum total of correlations of all tokens per topic can then be generated, and the totals can be normalized by the length of the message.

The output of the topics feature extraction can be a vector of topics and the normalized correlation scores from the source text. This vector can be combined with the lexical features and misspelled word feature vectors to generate one final vector of feature values passed to the model at 85 for final analysis. It will be appreciated that each of the vectors described herein can have a single value or multiple values in a string, for example.

The final phase of the process is the model analysis phase. In this phase, the combined features vector is passed to a pre-trained model evaluator 48 to predict the overall risk score of the received message. In various embodiments, the risk score is calculated as a value between zero and one, and any score above a 0.5 is considered a possible social engineering attack. The risk score can be considered output of the model evaluator 48.

It will be appreciated that the model evaluator 48 can be trained using various corpora that provide a vast data set of normal business communications and other data sets of exemplary or manually generated known social engineering attack messages. Each of these samples can then have the features detailed above extracted and used to train the model on "benign" and "potential attack" classes of messages.

Thus, according to various embodiments, the host 40 receives a source message, extracts an initial attribute from the source message to present a pre-processed version of the source message, determines whether the extracted initial attribute is or includes a special feature so as to generate a lexical feature vector, detects a language of the pre-processed version of the source message and based on the detected language, tokenizes the pre-processed version of the source message to generate a cleaned token list including one or more tokens. The host can then extract a number of misspelled words from the cleaned token list to generate a spelling feature vector and, based on determining whether the cleaned token list includes one or more suspicious topics, generate a topics vector and a correlation score for each token in the cleaned token list. Further, the host can, based on the lexical feature vector, the spelling vector and the topics vector, apply the model to predict a risk score for the source message, and upon the risk score exceeding a risk threshold, classify the source message as a social engineering attack.

In various embodiments, determining whether the extracted initial attribute includes a special feature involves determining whether the extracted initial attribute is (i) a URL with an IP address, (ii) a URL having a threshold minimum number of characters, (iii) a URL having a threshold minimum number of periods, (iv) a fake domain and (v) a URL comprising a brand name. In various embodiments, extracting a number of misspelled words from the cleaned token list includes generating a normalized metric based on a length of the pre-processed version of the source message. It will be appreciated that determining whether the cleaned token list includes one or more suspicious topics can involve processing the cleaned token list to determine if an underlying message in the cleaned token list is an authoritative action request, a call to action request, a credentials information or update request, a payment or invoice related message, a personal information request, a secrecy request, an urgent action request, an unexpected prize or award offer and a report of suspicious activity. It will further be appreciated that determining whether the cleaned token list includes one or more suspicious topics includes transforming each token from the cleaned token list into an embeddings representation by applying an NLP bidirectional transformer. In various embodiments, determining whether the cleaned token list includes one or more suspicious topics further involves calculating a correlation between the embedded representation for each token and a topic embedding generated from a lexicon for each message of a suspicious message type, where the suspicious message type is any of: (i) an urgent message, (ii) a surprise message, (iii) a gift message, (iv) a private message, (v) a message pertaining to a credential, (vi) a fear message, (vii) a payment message, (viii) an invoice message, (ix) an impersonation message and (x) a call to action message.

According to various embodiments, determining whether the cleaned token list includes one or more suspicious topics further involves generating a maximum correlation score of all suspicious message types for each token and upon the generated score being below a minimum threshold, setting the suspicious message type score to zero. Such approach can further involve generating a sum total of correlations of all tokens per suspicious message type and normalizing the totals by the length of the message.

In additional embodiments, the system and method for detecting social engineering attacks according to the present disclosure involves receiving a source message from a computing device such as an individual computer, a host, a server, a portable communications device or other computing device, extracting initial attributes from the source message, preparing a cleaned token list including one or more tokens based upon the source message, extracting a lexical feature, a spelling feature and a topic feature from the cleaned token list and based on the lexical feature, the spelling feature and the topic feature, applying a model to predict a risk score for the source message. In various embodiments, upon the risk score exceeding a risk threshold, the source message is classified as a social engineering attack.

It will be appreciated that the system, device and method as described herein can be extended to any digital channel, such as email, sms, and other digital messaging environments and tools. As shown in FIG. 1, data storage 60 can comprise an internal store of information related to the functions provided by the preprocessor 42, language detector 43, text preparer 44, lexical feature extractor 45, spelling feature extractor 46, topics feature extractor 47 and model evaluator 48. In embodiments, the database 60 can store multiple different models for use as model evaluators 48. Such models can be provided as independent and/or interoperable software components in various embodiments of the present disclosure.

Examples of Operation

It will be appreciated that the presently disclosed system, method and apparatus can operate in a variety of environments. An exemplary environment is an electronic mail environment for an organization where hundreds, thousands or even millions of e-mail messages are received on a daily basis. E-mails may be sent to one or more employees of the organization, where the e-mail contains a sender e-mail address, a subject matter description and an e-mail body. The address, subject matter description and e-mail body may be considered an electronic message or source message for purposes of the present disclosure. In various embodiments, the source message includes message metadata. In the following example, assume the organization has a chief executive officer (CEO) named Suzie Quintillion and has a business relationship with a company named XABC Co.

A first spear phishing e-mail may be sent to Employee A purporting to be sent by the CEO. The message may include an e-mail sender's name in the sender e-mail address, the subject matter description and/or the e-mail body. The e-mail body may include a long description explaining a scenario whereby the organization's CEO purportedly needs access credentials from Employee A in order to access certain proprietary documents related to a large transaction, financial information or other important information that is not for public consumption. The e-mail body may include a hyperlink labeled as "Link" that, when hovered over using a mouse, for example, may identify a URL or IP address associated with the true sender, such as a URL www.x1abc.com/this-is-a-spearphishing-message/lft9438/ signup/Agent93233801, which has a second level domain that differs from the second level domain for XABC Co. by a single character and is lengthy compared to typically legitimate URL links. The purported sender's name may also be spelled as Suzie Quintillon, which is a misspelling of the true company CEO. Further, the sender's e-mail address may be provided in the e-mail sender information or in the e-mail body without a second level domain that matches the organization's second level domain. For example, if the organization's domain is Queuecompany.biz, where "biz" is the top level domain and Queuecompany is the second level domain, the sender's e-mail address may be provided in the electronic message as SQ@Quuecompany.biz, which would not be the same as the organization's second level domain.

In processing the electronic message to assess whether it may be considered a social engineering attack, embodiments of the present disclosure receive the source message as at 70 in FIG. 2. At 72, the language detector 43 can detect the language of the source message. At 74, the electronic message is preprocessed such as by extracting one or more key attributes. In the example described herein, extracted key attributes can be the URL www.xlabc.com/this-is-a-spearphishing-message/lft9438/signup/Agent93233801 and the e-mail address SQ@Quuecompany.biz. The preprocessed message is passed to the text preparer 44 as at 76. It will be appreciated that the language detector 43 can optionally be employed before or after the message is preprocessed, such that either the language of the source message is detected or the language of the preprocessed message is detected. The extracted key attributes can be sent to the lexical feature extractor 45 as at 78. In various embodiments, a language specific processor 79 is optionally employed as indicated by dashed lines after the language detection at 72. The language specific processor 79 is a NLP language model that has been trained with target language reference corpora to identify social engineering attacks using reference corpora based on the topics identified as described elsewhere herein. When invoked with the input text, it will evaluate the risk and provide a score representing overall text risk. This output score can also be used in conjunction with the output of the separate path(s) illustrated at 78, 80 and/or 82 to combine a risk score as described elsewhere herein. Alternatively, the risk score provided by language specific processor 79 can be the final risk score. In various embodiments, language specific processor 79 is employed if the language of the input text is English as determined by the language detector 43.

At 76, the text preparer 44 can receive the source message and break it up into logical tokens for evaluation in the feature extraction phase. For example, the message may state:

Hello Employee A,

How are you doig today? I am following up on the recent company meting and gathering information for interested parties related to the transaction the company is working on. Unfortunately, I am in meting with interested investors and cannot access the secure fils. Here is a link to our secure file site. Please send your access credentials to me imediately by e-mail. Thank you very much. Suzie Quintillon The message may contain several spelling errors as shown above. Further, the "link" in the above message can be a hyperlink to a URL such as the lengthy URL described above. If clicked, the link may open a disguised HTML file with code that may trigger a notification telling the user they have been logged out of their system and need to log back in. If the user attempts to log back in, the fraudulent web interface collects the user's credentials and sends them to the perpetrator for nefarious activities.

In breaking up the message, the text preparer 44 can tokenize the message, label parts of speech and/or remove stop words as noted above. The text preparer 44 sends the prepared message to spelling feature extractor 46 as at 80 and to topics feature extractor 47 as at 82.

The spelling feature extractor 46 can extract and/or count spelling errors in the cleaned tokens such as "doig" and "meting" as at 80 in FIG. 2, for example. In various embodiments, the spelling feature extractor 46 can be trained on an organization's key words and/or names, such that the spelling feature extractor 46 may note that the CEO's name was misspelled or the company name was misspelled in the sender's email address in the above example. The spelling feature extractor 46 can thus determine that the seventy-one words in the above message contain six (or more) spelling errors, resulting in at least eight percent of the words being misspelled. In various embodiments where stop words are removed, the percentage of misspelled words may be higher. The spelling feature extractor 46 can generate a spelling feature vector for use by the model 48 as described elsewhere herein. In various embodiments, the spelling feature vector is a single value between zero and one determined by dividing the total number of words by the number of misspelled words.

At 78, the lexical feature extractor 45 can receive the attribute list from the preprocessor 42 and evaluate the elements of the attributes that may indicate an attack. For example, the URL and the e-mail attributes noted above can be identified and stored for use in the overall risk assessment. The lexical feature extractor 45 can generate a lexical feature vector for use by the model 48 as described elsewhere herein. As an example, the lexical feature list can appear as:

"IP address": 0,
"Dot number": 1,
"Token number": 6,
"URL length": 39,
"SLD contains dash symbol": 1,
"URL contains brand name (not in SLD)": 1,
"SLD contains brand name": 1

The corresponding vector used internally according to embodiments described herein would then be ['0', '1', '6', '39', '1', '1', '1'].

At 82, the topics feature extractor 47 evaluates the cleaned tokens to assess for topics such as urgency, awards and other topics as described above. In the message example described above, the topics feature extractor 47 can determine that the message contains an urgent topic given the purported urgent message from the CEO, and a secrecy topic, given the purported secure nature of the files to be accessed. The message further contains a request for credentials and a message of suspicious activity in the form of a message indicating the user has been logged out of a computer system. The message further contains an authority topic as it is being purportedly sent by the organization's CEO and a call to action, as it requests the recipient to take action. As such, the topics feature extractor 47 may identify several topics included in social engineering attacks. Such topic identification can be performed, in various embodiments, using text analysis. For example, topics feature extractor 47 may scan the text of a source message or processed message to identify one or more terms such as "urgent", "secret", "credential", "help" and other terms, or may scan the text to identify particular root words.

As noted above, each token created by the text preparer 44 can be transformed by the topics feature extractor 47 into an embeddings representation using state of the art NLP techniques based on bidirectional transformers that rely on unannotated text drawn from the web. Second, correlations (e.g., cosine similarity) can be calculated between the token embedding and topic embeddings that can be generated from a lexicon for each topic. In various embodiments, topic reference data is employed as at 77 in FIG. 2. For each token, a maximum correlation score of all topics is generated, and the correlation score is compared to a minimum threshold. If the correlation score is below a threshold, the topic score can be set to zero, for example. A sum total of correlations of all tokens per topic can then be generated, and the totals can be normalized by the length of the message. In the above example, the number of categorized topics is six based on the message containing an urgent topic, a secret topic, a credential request topic, a suspicious activity topic, an authority topic and a call to action topic.

Given the relatively large number of topics in a message of seventy-one words, the topics feature extractor 47 may provide a relatively higher score for the example message indicating a likely social engineering attack. The output of the topics feature extraction can be a vector of topics and the normalized correlation scores from the source text.

The lexical feature extractor 45, spelling feature extractor 46 and topics feature extractor 47 send the results of their evaluation to a model evaluator 48 as at 85. In various embodiments, the model evaluator 48 can be a pretrained NLP model that has been trained on a large corpus of feature vectors extracted from both normal communications as well as social engineering attack messages. It can predict the overall risk score of the received message based on these inputs using logistic regression to determine which class it most resembles, normal communication or social engineering. The risk score can be considered output as at 88 in FIG. 2. In various embodiments, the calculations to determine risk are rather complex and dependent on the machine learning (ML) algorithm used. In some embodiments, logistic regression can be employed.

In various embodiments, the system as described herein can process hundreds, thousands or even millions of messages in near real-time as they are received by a computing device such as an e-mail server, for example. Any source messages that are flagged as meeting a risk threshold (predefined or otherwise) can be withheld from immediate transmission to the intended recipient or otherwise processed in an effort to thwart or minimize the perceived risk. In this way, only messages that are not perceived to be risky can be passed to the intended recipients. Source messages that are considered a risk can be evaluated further and deleted, transmitted to proper authorities or otherwise acted upon as deemed appropriate.

As a further example, consider the following input text: "AmazonID: Our system has found illegal payments on your account. We have disabled access to your account. Please update the required documents to regain access. Click here to continue. https://my-account-amazon.com/?VerifyID".

After the lexical and/or text artifacts are extracted, the clean text appears as "AmazonID: Our system has found illegal payments on your account. We have disabled access to your account. Please update the required documents to regain access. Click here to continue." The extracted lexical artifact is "https://my-account-amazon.com/?VerifyID". The lexical feature list can appear as:

"IP address": 0,
"Dot number": 1,
"Token number": 6,
"URL length": 39,
"SLD contains dash symbol": 1,
"URL contains brand name (not in SLD)": 0,
"SLD contains brand name": 1

The lexical score can then be generated with a value of "1".

An example of processed text from the above input text is shown in Table 1 below. As shown therein, each tokenized word may have a lemma that is the same or a different form or inflection of the tokenized word. For example, as shown in Table 1, the tokenized word "has" may have a lemma of "have" and the tokenized word "required" may have a lemma of "require". Also, the abbreviations for the part of speech can be organized such that "ADV" stands for adverb, "PUNCT" stands for punctuation, "NOUN" stands for noun, "DET" stands for determiner, "AUX" stands for auxiliary verb, "VERB" stands for verb, "ADJ" stands for adjective, "ADP" stands for adposition "PRON" stands for pronoun, "INTJ" stands for interjection, "PROPN" stands for proper noun, "CONJ" stands for conjunction and "PART" stands for participle or preposition.

TABLE 1

| Token | Lemma | Part of Speech |
| --- | --- | --- |
| amazonID | amazonid | ADV |
| : | : | PUNCT |
| Our | -PRON- | DET |
| system | system | NOUN |
| has | have | AUX |
| found | find | VERB |
| illegal | illegal | ART |
| payments | payment | NOUN |
| on | on | ADP |
| your | -PRON- | DET |
| account | account | NOUN |
| . | . | PUNCT |
| SPACE | | |
| We | -PRON- | PRON |
| have | have | AUX |
| disabled | disabled | ADJ |
| acces | acce | NOUN |
| to | to | ADP |
| your | -PRON- | DET |
| account | account | NOUN |
| . | . | PUNCT |
| SPACE | | |
| Please | please | INTJ |
| update | update | VERB |
| the | the | DET |
| required | require | VERB |
| documents | document | NOUN |
| to | to | PART |
| regain | regain | VERB |
| access | access | NOUN |
| . | . | PUNCT |
| SPACE | | |
| Click | Click | PROPN |
| here | here | ADV |
| to | to | PART |
| continue | continue | VERB |
| . | . | PUNCT |

Example embeddings for each lemma from the input text are shown in Table 2 below. As can be seen, the embeddings for each lemma are strings of lengthy numbers.

TABLE 2

| Lemma | Embedding Sample |
| --- | --- |
| amazonid | [ 9.50036719e−02 −7.66026527e−02 −2.63965353e−02 −2.57854722e−02 . . . ] |
| : | [ 1.30602449e−01 3.48239578e−02 3.12353428e−02 −9.84880421e−03 . . . |
| -PRON- | [ 0.12062442 0.02145381 −0.00951916 0.02242718 0.08400631 . . . |
| system | [ 1.13411702e−01 −1.36786625e−02 −5.01794321e−03 6.03959896e−02 . . . |
| have | [ 0.10869752 −0.01101791 −0.02263854 −0.0246376 0.02112032 0.00750811 . . . |
| find | [ 0.10885122 −0.00646173 0.00701091 0.0028401 −0.04643063 0.02612611 . . . |
| illegal | [ 9.36753824e−02 −7.38347843e−02 5.36227366e−04 −3.37364040e−02 . . . |
| payment | [ 1.14966013e−01 −2.27882843e−02 −7.90488943e−02 4.73240279e−02 . . . |

TABLE 2-continued

| Lemma | Embedding Sample |
|---|---|
| on | [ 1.17204018e−01 1.91065706e−02 −3.98480296e−02 −8.59033875e−03 . . . |
| -PRON- | [ 0.11895696 0.01459177 −0.03491072 0.00248735 0.05596504 . . . |
| account | [ 0.11766089 0.0042334 −0.07420665 −0.00436161 −0.05662119 . . . |
| . | [ 1.6417676e−01 3.91693078e−02 1.56959631e−02 8.29747785e−03 . . . |
|  | [ 0.11385567 0.03439821 −0.00617533 0.00489971 −0.02247705 . . . |
| -PRON- | [ 0.1092709 0.00896396 −0.01207121 0.01715946 0.0837987 . . . |
| have | [ 0.10591659 0.00670179 −0.03331553 −0.01963392 −0.00039411 . . . |
| disabled | [ 1.15482919e−01 −3.48984031e−03 1.06243379e−02 3.16267163e−02 . . . |
| acce | [ 1.20183237e−01 −3.70001383e−02 −2.38191569e−03 3.26452926e−02 . . . |
| to | [ 0.10741.46 −0.00482159 −0.0362882 −0.00730225 −0.02983516 . . . |
| -PRON- | [ 0.11895696 0.01459177 −0.03491072 0.00248735 0.05596504 . . . |
| account | [ 0.11766089 0.0042334 −0.07420665 −0.00436161 −0.05662119 . . . |
| . | [ 1.64137676e−01 3.91693078e−02 1.56959631e−02 8.29747785e−03 . . . |
|  | [ 0.11385567 0.03439821 −0 00617533 0.00489971 −0.02247705 . . . |
| please | [[ 1.21964805e−01 3.01082768e−02 1.32591845e−02 4.74429429e−02 . . . |
| update | [ 1.12278745e−01 2.67980304e−02 3.31783928e−02 5.83143756e−02 . . . |
| the | [ 1.20232984e−01 1.34456875e−02 −1.40082408e−02 4.39665746e−03 . . . |
| require | [ 1.21205159e−01 −4.15439857e−03 −2.71025822e−02 1.88502129e−02 . . . |
| document | [ 0.10557416 −0.0228969 −0.04067348 0.07469383 −0.05368876 . . . |
| to | [ 0.1074146 −0.00482159 −0.0362882 −0.00730225 −0.02983516 . . . |
| regain | [ 1.03808135e−01 2.24462990e−02 −1.63012706e−02 −5.37099224e−03 . . . |
| access | [ 1.17901623e−01 −3.741388406 −02 1.17536653e−02 3.25362831e−02 . . . |
| . | [ 1.64137676e−01 3.91693078e−02 1.56959631e−02 8.29747785e−03 . . . |
|  | [ 0.11385567 0.03439821 −0.00617533 0.00489971 −0.02247705 0.01876757 . . . |
| Click | [ 0.11247737 0.05496026 0.04927593 −0.01149615 −0.01867649 . . . |
| here | [ 0.09657086 −0.01164864 −0.03525791 −0.00016903 −0.06670374 . . . |
| to | [ 0.1074146 −0.00482159 −0.0362882 −0.00730225 −0.02983516 . . . |
| continue | [ 1.10687375e−01 4.15358432e−02 −3.55322696e−02 −2.60849018e−02 . . . |
| . | [ 1.64137676e−01 3.91693078e−02 1.56959631e−02 8.29747785e−03 . . . |

Example embeddings for each part of speech (POS) from the input text are shown in Table 3 below, and it will be appreciated that the embeddings for each POS tag are strings of lengthy numbers.

TABLE 3

| POS Tag | Embedding Sample |
|---|---|
| ADV | [ 0.10580494, −0.02518838, 0.04894039, −0.02921778, . . . |
| PUNCT | [ 1.40120998e−01, −1.15442381e−03, 5.33083938e−02, 4.06831615e−02 . . . |
| DET | [ 1.18066952e−01, −9.58943681e−04, 2.670.30019e−02, 1.408846 32e−02 . . . |
| NOUN | [ 0.12382878, −0.04522786, 0.02235749, 0.02085628, . . . |
| AUX | [ 1.15828715e−01, −9.13494155e−02, −2.19421717e−03, −1,42395673e−02 . . . |
| VERB | [ 1.20264068e−01, −2.37794910e−02, 1.15521839e−02, 2.29941458e−02 . . . |
| ADJ | [ 1.02984577e−01, 3.53354029e−02, 5.23073412e−02, −1.09475816e−03 . . . |
| ADP | [ 1.02937788e−01, −2.33283956e−02, 4.45511937e−02, −2.55675558e−02 . . . |
| SPACE | [ 0.10580513, −0.03927498, 0.04885805, −0.07894014, . . . |
| PRON | [ 1.35786220e−01, 3.91078107e−02, 3.22274603e−02, −4.30890247e−02 . . . |
| INTJ | [ 8.40357393e−02, −3.40338377e−03, −5.62375002e−02, 1.23742130e−02 . . . |
| PART | [ 0.1468817, 0.01644492, 0.02735075, −0.01908872, −0.02487115 . . . |
| PROPN | [ 1.29361615e−01, 4.07005735e−02, 2.65965965e−02, −5.61000519e−02 . . . |

Once the embeddings are generated, correlations are calculated between the token embedding and topic embeddings that can be generated from a lexicon for each topic. Thus, if a topic is "surprise/award", the token embeddings generated as described elsewhere herein are compared to topic embeddings generated from a lexicon for the "surprise/award" topic. Similar comparisons are made for all different topics considered. In this way and with other aspects as disclosed herein, the present disclosure overcomes prior difficulties and inaccuracies encountered with simple keyword searching of input text and other methods for attempting to detect social engineering attacks.

In the current example, analysis of the text-based features can yield different assessment or risk scores for different topics. An example list of scores for a variety of topics is provided below.
"Authority/Boss": 0.4499574343363444
"Credentials/Password Change": 0.41665735244750975
"Payments/Invoices": 0.43798745473225914
"Personal information": 0.687760925529296877
"Privacy/Secrecy": 0.25926424662272135
"Surprise/Award": 0
"Suspicious Activity": 0.454310671488444
"Urgency": 0.58612867991129557
"Call_to_action": 0.64313656091690063
"Spellchecker_feature": 0.125

Once all of the topic scores are determined, an overall model risk score can be generated as discussed elsewhere herein. For the given example, an exemplary model risk score can be 0.9203894397743921. In various embodiments, the lexical score (e.g., "1" above) can be aggregated with the model score (e.g., 0.9203894397743921) and an overall confidence rating or score (e.g., "1") can be determined.

It will be appreciated that a system in accordance with the present disclosure provides a technical solution to the challenge of identifying social engineering attacks from digital communications. The system can be provided as a computer-based system, where the components can be implemented in hardware, software, firmware, or combinations thereof, as illustrated in FIG. 1, for example. It will be appreciated that access can be provided over a public or private network 20, including the Internet, in various embodiments of the present invention. Further, external systems 50 (see FIG. 1) can be accessed via the present system for temporary storage of files, for reference data or other functions consistent with the present disclosure. Embodiments of the system and method can process large volumes of messages in near real-time while flagging individual messages as risks suitable for removal, deletion or further action as appropriate. Such actions as described herein facilitate and improve computing operations for those desiring to avoid social engineering attacks.

The above-described embodiments of the present disclosure may be implemented in accordance with or in conjunction with one or more of a variety of different types of systems, such as, but not limited to, those described below.

The present disclosure contemplates a variety of different systems each having one or more of a plurality of different features, attributes, or characteristics. A "system" as used herein refers to various configurations of: (a) one or more hosts; and optionally (b) other computing devices, such as servers, desktop computers, laptop computers, tablet computers, personal digital assistants, mobile phones, and other mobile computing devices.

The host(s) and/or other computing devices can be any suitable computing device (such as a server) that includes at least one processor and at least one memory device or data storage device. As further described herein, the processor can be configured to transmit and receive data or signals representing events, messages, commands, or any other suitable information.

In embodiments in which the system includes a computing device configured to communicate with a host through a data network, the data network can be a local area network (LAN), a wide area network (WAN), a public network such as the Internet, or a private network. The host and the computing device are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium.

It will be appreciated that any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing, including a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented as entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

It will be appreciated that all of the disclosed methods and procedures herein can be implemented using one or more computer programs or components. These components may be provided as a series of computer instructions on any conventional computer-readable medium, including RAM, SATA DOM, or other storage media. The instructions may be configured to be executed by one or more processors which, when executing the series of computer instructions, performs or facilitates the performance of all or part of the disclosed methods and procedures.

Unless otherwise stated, devices or components of the present disclosure that are in communication with each other do not need to be in continuous communication with each other. Further, devices or components in communication with other devices or components can communicate directly or indirectly through one or more intermediate devices, components or other intermediaries. Further, descriptions of embodiments of the present disclosure herein wherein several devices and/or components are described as being in communication with one another does not imply that all such components are required, or that each of the disclosed components must communicate with every other component. In addition, while algorithms, process steps and/or method steps may be described in a sequential order, such approaches can be configured to work in different orders. In other words, any ordering of steps described herein does not, standing alone, dictate that the steps be performed in that order. The steps associated with methods and/or processes as described herein can be performed in any order practical. Additionally, some steps can be performed simultaneously or substantially simultaneously despite being described or implied as occurring non-simultaneously.

It will be appreciated that algorithms, method steps and process steps described herein can be implemented by appropriately programmed computers and computing devices, for example. In this regard, a processor (e.g., a microprocessor or controller device) receives instructions from a memory or like storage device that contains and/or stores the instructions, and the processor executes those instructions, thereby performing a process defined by those instructions. Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on a user's computer, partly on a user's computer, as a stand-alone software package, partly on a user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Where databases are described in the present disclosure, it will be appreciated that alternative database structures to those described, as well as other memory structures besides databases may be readily employed. The drawing figure representations and accompanying descriptions of any exemplary databases presented herein are illustrative and not restrictive arrangements for stored representations of data. Further, any exemplary entries of tables and parameter data represent example information only, and, despite any depiction of the databases as tables, other formats (including relational databases, object-based models and/or distributed databases) can be used to store, process and otherwise manipulate the data types described herein. Electronic storage can be local or remote storage, as will be understood to those skilled in the art. Appropriate encryption and other security methodologies can also be employed by the system of the present disclosure, as will be understood to one of ordinary skill in the art.

The present disclosure describes numerous embodiments of the present invention, and these embodiments are presented for illustrative purposes only. These embodiments are described in sufficient detail to enable those skilled in the art to practice the invention embodiments, and it will be appreciated that other embodiments may be employed and that structural, logical, software, electrical and other changes may be made without departing from the scope or spirit of the present invention. Accordingly, those skilled in the art will recognize that the present invention may be practiced with various modifications and alterations. Although particular features of the present invention can be described with reference to one or more particular embodiments or figures that form a part of the present disclosure, and in which are shown, by way of illustration, specific embodiments of the invention, it will be appreciated that such features are not limited to usage in the one or more particular embodiments or figures with reference to which they are described. The present disclosure is thus neither a literal description of all embodiments of the invention nor a listing of features of the invention that must be present in all embodiments.

The invention claimed is:

1. A computer-implemented method, comprising:
   receiving, by a host, a source message;
   extracting, by the host, an initial attribute from the source message to present a pre-processed version of the source message;
   determining, by the host, whether the extracted initial attribute comprises a special feature so as to generate a lexical feature vector;
   detecting, by the host, a language of the source message or the pre-processed version of the source message;
   based on the detected language, tokenizing, by the host, the pre-processed version of the source message to generate a cleaned token list comprising a plurality of tokens;
   extracting, by the host, a number of misspelled words from the cleaned token list to generate a spelling feature vector;
   based on determining whether the cleaned token list includes one or more suspicious topics, generating, by the host, a topics vector and a correlation score for each token of the plurality of tokens in the cleaned token list;
   based on the lexical feature vector, the spelling vector and the topics vector, applying, by the host, a model to predict a risk score for the source message; and
   upon the risk score exceeding a risk threshold, classifying the source message as a social engineering attack.

2. The method of claim 1, wherein extracting the initial attribute comprises identifying and removing at least one of: a URL, an email address, and an IP address.

3. The method of claim 1, wherein determining whether the extracted initial attribute comprises a special feature comprises determining whether the extracted initial attribute comprises one of: a URL with an IP address, a URL comprising a threshold minimum number of characters, a URL comprising a threshold minimum number of periods, a fake domain and a URL comprising a brand name.

4. The method of claim 1, wherein the extracting of the number of misspelled words from the cleaned token list comprises generating a normalized metric based on a length of the pre-processed version of the source message.

5. The method of claim 1, wherein determining whether the cleaned token list includes the one or more suspicious topics comprises processing the cleaned token list to determine if an underlying message in the cleaned token list comprises an authoritative action request, a call to action request, a credentials information or update request, a payment or invoice related message, a personal information request, a secrecy request, an urgent action request, an unexpected prize or award offer and a report of suspicious activity.

6. The method of claim 1, wherein determining whether the cleaned token list includes the one or more suspicious topics comprises:
   transforming each token of the plurality of tokens from the cleaned token list into an embedded representation by applying a universal sentence encoder.

7. The method of claim 6, wherein determining whether the cleaned token list includes the one or more suspicious topics further comprises:
   calculating a correlation between the embedded representation for each token of the plurality of tokens from the cleaned token list and a topic embedding generated from a lexicon for the source message when the source message is of a suspicious message type comprising one of: an urgent message, a surprise message, a gift message, a private message, a message pertaining to a credential, a fear message, a payment message, an invoice message, an impersonation message and a call to action message.

8. The method of claim 7, wherein determining whether the cleaned token list includes the one or more suspicious topics further comprises:
generating a maximum correlation score of all suspicious message types for each token of the plurality of tokens from the cleaned token list;
upon the generated score being below a minimum threshold, setting the suspicious message type score to zero;
generating a sum total of correlations of all the tokens per the suspicious message type; and
normalizing the totals by the length of the source message.

9. A system for detecting a social engineering attack, comprising:
a processor; and
a memory device storing a plurality of instructions which, when executed by the processor, cause the processor to:
receive a source message;
extract an initial attribute from the source message to present a pre-processed version of the source message;
determine whether the extracted initial attribute comprises a special feature so as to generate a lexical feature vector;
detect a language of the source message or the pre-processed version of the source message;
based on the detected language, tokenize the pre-processed version of the source message to generate a cleaned token list comprising a plurality of tokens;
extract a number of misspelled words from the cleaned token list to generate a spelling feature vector;
based on determining whether the cleaned token list includes a suspicious topic, generate a topics vector and a correlation score for each token of the plurality of tokens in the cleaned token list;
based on the lexical feature vector, the spelling vector and the topics vector, apply a model to predict a risk score for the source message; and
upon the risk score exceeding a risk threshold, classify the source message as a social engineering attack.

10. The system of claim 9, wherein extracting the initial attribute comprises identifying and removing at least one of: a URL, an email address, and an IP address.

11. The system of claim 9, wherein determining whether the extracted initial attribute comprises a special feature comprises determining whether the extracted initial attribute comprises one of: a URL with an IP address, a URL comprising a threshold minimum number of characters, a URL comprising a threshold minimum number of periods, a fake domain and a URL comprising a brand name.

12. The system of claim 9, wherein the extracting of the number of misspelled words from the cleaned token list comprises generating a normalized metric based on a length of the pre-processed version of the source message.

13. The system of claim 9, wherein determining whether the cleaned token list includes the suspicious topic comprises processing the cleaned token list to determine if an underlying message in the cleaned token list comprises one of: an authoritative action request, a call to action request, a credentials information or update request, a payment or invoice related message, a personal information request, a secrecy request, an urgent action request, an unexpected prize or award offer and a report of suspicious activity.

14. The system of claim 9, wherein determining whether the cleaned token list includes the suspicious topic comprises:
transforming each token of the plurality of tokens from the cleaned token list into an embedded representation by applying a universal sentence encoder.

15. The system of claim 14, wherein determining whether the cleaned token list includes the suspicious topic further comprises:
calculating a correlation between the embedded representation for each token of the plurality of tokens from the cleaned token list and a topic embedding generated from a lexicon for the source message when the source message is of a suspicious message type comprising one of: an urgent message, a surprise message, a gift message, a private message, a message pertaining to a credential, a fear message, a payment message, an invoice message, an impersonation message and a call to action message.

16. The system of claim 15, wherein determining whether the cleaned token list includes the suspicious topic further comprises:
generating a maximum correlation score of all suspicious message types for each token of the plurality of tokens from the cleaned token list;
upon the generated score being below a minimum threshold, setting the suspicious message type score to zero;
generating a sum total of correlations of all the tokens per the suspicious message type; and
normalizing the totals by the length of the source message.

17. A system for detecting a social engineering attack, comprising:
a processor; and
a memory device storing a plurality of instructions which, when executed by the processor, cause the processor to:
receive a source message from a computing device;
extract initial attributes from the source message;
prepare a cleaned token list comprising a plurality of tokens based upon the source message;
extract a lexical feature, a spelling feature and a topic feature from the cleaned token list;
based on the lexical feature, the spelling feature and the topic feature, apply a model to predict a risk score for the source message; and
upon the risk score exceeding a risk threshold, classifying the source message as the social engineering attack.

18. The system of claim 17, wherein extracting the initial attribute comprises identifying and removing at least one of: a URL, an email address, and an IP address.

19. The system of claim 17, wherein the topic feature is extracted by determining whether the cleaned token list includes a suspicious topic and processing the cleaned token list to determine if an underlying message in the cleaned token list comprises one of: an authoritative action request, a call to action request, a credentials information or update request, a payment or invoice related message, a personal information request, a secrecy request, an urgent action request, an unexpected prize or award offer and a report of suspicious activity.

20. The system of claim 17, wherein the topic feature is extracted by:
generating a maximum correlation score of all suspicious message types for each token;

upon the generated score being below a minimum threshold, setting a suspicious message type score to zero;

generating a sum total of correlations of all the tokens per the suspicious message type; and normalizing the totals by the length of the source message.

21. A system for detecting a social engineering attack, comprising:

a processor; and a memory device storing a plurality of instructions which, when executed by the processor, cause the processor to:
  receive a source message from a computing device;
  detect a language of the source message;
  apply a language specific processor to the source message to identify a potential social engineering attack:
  apply a model to predict a risk score for the source message based on the identified potential social engineering attack: and
  upon the risk score exceeding a risk threshold, classifying the source message as the social engineering attack.

* * * * *